Patented Aug. 25, 1936

2,052,283

UNITED STATES PATENT OFFICE 2,052,283

PROCESSES FOR BREAKING PETROLEUM EMULSIONS

Melvin De Groote, St. Louis, Mo., assignor to Tretolite Company, Webster Groves, Mo., a corporation of Missouri No Drawing. Application December 21, 1935, Serial No. 55,620

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other separatory procedures.

The treating agent used in my process consists of an ester of heptoic acid, and particularly an ester of heptoic acid derived by reaction between heptoic acid and an alcohol-acid type of material, such as ricinoleic acid.

Various fatty acid esters have been used in demulsification of crude oil emulsions. Among such esters are those derived by reaction between keto fatty acids, polyketo fatty acids, hendecenoic acid, oxy-hendecenoic acid, octadecadiene acid, oxy-octadecadiene acid, dicarboxylic acids, such as pimelic acid, suberic acid, azelaic acid, sebacic acid, etc., and such alcohol type materials as glycerol, ricinoleic acid, polyricinoleic acid, etc., characterized by the presence of an alcoholiform hydroxyl.

Heptoic acid is a material of the composition indicated by the formula $C_7H_{14}O_2$. It is also referred to as normal heptylic acid, amyl acetic acid, oenanthic acid, or oenanthylic acid. Heptoic acid may also exist in an isomeric form, such as iso-heptoic acid, also referred to as iso-heptylic acid. Hereinafter, the word "heptoic" acid will be used in the generic sense to apply to the ordinary normal heptoic acid, or any of its isomers which appear to be equally satisfactory in the production of the treating agent or demulsifying agent contemplated by my present process.

Heptoic acid is readily obtainable by oxidation of heptaldehyde, which, in turn, can be obtained in various manners, including the pyrolytic decomposition of castor oil or ricinoleic acid.

Esters can be obtained from heptoic acid by the conventional methods employed to produce esters, which consist in heating the acid with an alcoholic type of material and employing suitable means to remove any water which may be formed, such as passing through dry carbon dioxide, etc. The presence of dry hydrochloric acid gas, of course, hastens such reactions. If an ester is produced in which heptoic acid combines with one hydroxyl of a polyhydric alcohol, such as glycerol, then the remaining hydroxyls may be further combined with heptoic acid, or may be combined with some other suitable fatty acid, such as ricinoleic acid, keto fatty acids, polyketo fatty acids, oxy-hendecenoic acid, oxy-octadecadiene acid, oleic acid, etc.

In combining heptoic acid with an alcohol, one may combine it with an alcohol type, such as methyl alcohol, ethylene glycol, glycerol, etc., or one may combine it with the acid alcohol type of material, such as ricinoleic acid, polyricinoleic acid, etc. Other acid-alcohol types of material may be obtained by partial esterification of a polyhydric alcohol, such as ethylene glycol or glycerol, with a polybasic acid or its anhydride, such as oxalic acid, phthalic acid, maleic acid, etc. I have found that the most desirable reagents are obtained by reactions between heptoic acid and an acid alcohol type of material, as differentiated from the straight alcohol type of material, and especially with oxy-hendecenoic acid bodies. It is customary to refer to acids, such as ricinoleic acid, as hydroxy acids. From what has been said previously, it is apparent that chemical combinations of polyhydric alcohols and polybasic acids yield materials which have similar characteristics to hydroxy acids, so far as the formation of esters of heptoic acid is concerned; that is, the compound obtained is acidic in nature and contains an alcoholiform hydroxyl. For sake of convenience, the expression "acid-alcohol body" will be herein employed to include both types. The ricinoleic acid type will be referred to as a hydroxy acid body, and the polybasic acid, polyhydric alcohol type will be referred to by such nomenclature.

In U. S. Letters Patent No. 2,023,996, to Melvin De Groote and Bernhard Keiser, dated December 10, 1935, there is described a process for breaking petroleum emulsions by means of oxy-hendecenoic acid materials. As stated in said patent, hendecenoic acid is an unsaturated acid similar to certain fatty acids, but apparently not occurring naturally in any fat or oil. It is a lower homologue of oleic acid and is obtained by distilling ricinoleic acid or the glyceride thereof (castor oil) under diminished or atmospheric pressure. It is sometimes known as undecylenic acid. Its formation from ricinoleic acid, for example, is indicated by the following reaction:

$$C_{18}H_{34}O_3 = C_6H_{13}CHO + C_{11}H_{20}O_2$$

In preparing the treating agent or demulsifying agent employed in my present process, it is not necessary that the hendecenoic acid, which is used as a raw material, be absolutely pure, but it may be of a technical quality, so as to contain some unconverted castor oil and certain products of decomposition other than hendecenoic acid.

Oxy-hendecenoic acid bodies are derived from hendecenoic acid of technical purity in various manners, such as those outlined in the aforementioned De Groote and Keiser patent. One method employed is to form the fatty sulfates with subsequent hydrolysis. Another method is dependent upon oxidation or hydroxylation under certain controlled conditions. For example, hendecenoic acid of technical purity may be subjected to air oxidation by any of the methods conventionally employed for oxidation of castor oil and the like. In producing the treating agent used in my present process, I prefer to oxidize hendecenoic acid at relatively low temperature by means of moist air under pressure. I also prefer to use a temperature of 125 to 135° C., and use approximately 45 to 75 lbs. gauge pressure. If desired, hendecenoic acid may be oxidized at a higher temperature by means of air or oxygen at atmospheric pressure.

I have referred to the product obtained by oxidizing hendecenoic acid as "oxy-hendecenoic acid". The expression "oxy-hendecenoic acid" is intended to refer to the derivatives in which additional oxygen has been introduced into the molecules. For instance, this may be in the manner indicated by the formula $C_{11}H_{20}O_3$. This represents the saturation of the ethylene linkage by means of an atom of oxygen. It is believed that oxidation, especially with moist air, results in the conversion of this added oxygen atom into two hydroxyl radicals, so that ultimately one apparently obtains dihydroxy-hendecatoic acid, as indicated by the formula $C_{11}H_{20}(OH)_2O_2$. In other words, the addition product of hendecenoic acid is the substitution product, at least hypothetically, of hendecatoic acid.

As further stated in said De Groote and Keiser patent, it is immaterial whether there be introduced as oxygen atom or two hydroxyl radicals in the hendecenoic acid body to produce the oxy-hendecenoic acid body. It is obvious of course, where a hydroxyl is formed, that one has a hydroxylated fatty acid or hydroxylated fatty acid compound, and that the fatty acid at least may act either as an alcohol or as an acid in the same sense that ricinoleic acid, for example, may act as an alcohol or acid.

The demulsifying agent used in my present process is preferably prepared in the following manner:

220 lbs. of oxy-hendecenoic acid of technical purity are mixed with 130 lbs. of heptoic acid of technical purity, and after thorough mixing, the mass is heated to approximately 110° C., and dry carbon dioxide gas is passed through the mixture with constant stirring until the acid value remains constant, based on tests of samples taken at intervals. If the reaction does not proceed rapidly enough, higher temperatures, for instance, 125–135° C. may be employed. If desired, dry hydrochloric gas, or even dry air, may be substituted with a dry carbonic acid gas. The product thus obtained is a very efficient demulsifying agent, especially after dilution with some suitable solvent, so as to reduce viscosity, such as benzol, solvent, naphtha, kerosene, or propyl alcohol.

If desired, any free acidity which is present in the preferred reagent may be neutralized by triethanolamine or by any other suitable amine, such as monoamylamine, benzelamine, etc. The free acidic carboxyl may be converted into a salt, such as sodium, potassium, or ammonium salt. The free acidic carboxyl, of course, may be combined with an alcohol, such as ethyl, methyl, or propyl alcohol, or with glycerol.

The most economical procedure to produce the demulsifying agent used in my process, would be substantially a single operation, which would involve the pyrolytic decomposition of castor oil or ricinoleic acid in a manner previously indicated, so as to produce heptaldehyde and hendecenoic acid. Subsequent cautious oxidation would oxidize the heptaldehyde to heptoic acid without marked oxidation of the hendecenoic acid. This step of oxidation could then be followed by a second and more vigorous oxidation reaction, which would convert hendecenoic acid to oxy-hendecenoic acid. The reason that too vigorous oxidation must be guarded against at the earlier stages is that one would lose the heptaldehyde, which is extremely volatile.

The result of such controlled oxidation should yield essentially a mixture of heptoic acid and oxy-hendecenoic acid, or the glyceride thereof. Further heating without oxidation would, of course, yield an ester of the type contemplated for use as a reagent in the present process. After such oxidation, it might be necessary to employ not only heat, but also dry hydrochloric acid gas, to hasten the reaction.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene, oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000 or 1 to 30,000, such an apparent insolubility in oil and water is not significant, because said reagents undoubtedly have solubility within the concentration employed. This same fact is true in regard to the material or materials employed as the demulsifying agent of my process.

It has been so common to use a conventional demulsifying agent derived from an acid in the form of the acid itself, or in the form of a salt, or in the form of an ester, that the expression "acid body" is frequently employed to mean the acid itself, or the ester thereof, or the salt thereof. From what has been said previously, it is manifest that the ester employed in the present instance may represent a half ester in the sense that one may employ a compound which has the characteristic of an ester and a salt, or an ester and an alcohol, that is, a basic body, or an ester and an acid. Such materials are sometimes referred to as half esters, half salts, half acids, etc.

Heptoic acid may be combined with ethylene glycol, for example, and the compound so formed may be further esterified with a dibasic acid such as oxalic acid. The free carboxylic hydrogen of the oxalic acid residue may be neutralized with any suitable base, such as ammonium anhydroxide, caustic soda, caustic potash, triethanolamine, etc. Such a compound would represent a half salt. Similarly, the carboxylic hydrogen might remain unneutralized, and such an ester might be considered as a half acid. Similarly, only one hydroxyl of ethylene glycol might be esterified with heptoic acid, so as to yield a basic ester or a half alcohol.

The word "ester" is herein employed to mean a normal ester, or an ester exhibiting also the characteristics of a salt, an acid, or an alcohol, as previously described. Esters showing also the characteristics of a salt are referred to as the salt form of half esters, and esters having acid characteristics are referred to as the acid form of half esters. Similar nomenclature is employed in the claims in regard to the half alcohols.

It is obvious that where reactions involve polybasic acids having three or more replaceable hydrogens, or where reactions involve polyhydric alcohols having three or more hydroxyls, the expression "half" must also include the various forms which can be so derived. The word "half", of course, is most suitably employed in connection with derivatives from dibasic acids and dihydric alcohols.

In practising my process a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described my invention, what I claim as new and desire to secure by Letters Patent is:

1. A process for breaking petroleum emulsions of the water-in-oil type, which consists in subjecting the emulsion to the action of an ester of heptoic acid, derived from an acid-alcohol body.

2. A process for breaking petroleum emulsions of the water-in-oil type, which consists in subjecting the emulsion to the action of an ester of heptoic acid derived from a polybasic acid-polyhydric alcohol body.

3. A process for breaking petroleum emulsions of the water-in-oil type, which consists in subjecting the emulsion to the action of an ester of heptoic acid derived from a hydroxy acid body.

4. A process for breaking petroleum emulsions of the water-in-oil type, which consists in subjecting the emulsion to the action of an ester of heptoic acid derived from a hydroxy acid body, in which there is a ricinoleic acid residue present.

5. A process for breaking petroleum emulsions of the water-in-oil type, which consists in subjecting the emulsion to the action of an ester of heptoic acid derived from a hydroxy acid body, in which there is an oxy-hendecenoic acid residue present.

6. A process for breaking petroleum emulsions of the water-in-oil type, which consists in subjecting the emulsion to the action of an ester of heptoic acid derived from a hydroxy acid body, in which there is an oxy-octadecadine acid residue present.

MELVIN DE GROOTE.